United States Patent
Nakao

(10) Patent No.: US 12,478,358 B1
(45) Date of Patent: Nov. 25, 2025

(54) ROTATING FINE NEEDLE CORE BIOPSY DEVICE WITH IMPROVED CAMMING SUBASSEMBLY

(71) Applicant: Naomi L. Nakao, New York, NY (US)

(72) Inventor: Naomi L. Nakao, New York, NY (US)

( * ) Notice: Subject to any disclaimer, the term of this patent is extended or adjusted under 35 U.S.C. 154(b) by 0 days.

(21) Appl. No.: 19/172,140

(22) Filed: Apr. 7, 2025

(51) Int. Cl.
*A61B 10/04* (2006.01)
*A61B 10/02* (2006.01)

(52) U.S. Cl.
CPC ...... *A61B 10/04* (2013.01); *A61B 2010/0208* (2013.01); *A61B 2010/045* (2013.01)

(58) Field of Classification Search
CPC ............ A61B 10/04; A61B 2010/0208; A61B 2010/045
See application file for complete search history.

(56) References Cited

U.S. PATENT DOCUMENTS

| | | | |
|---|---|---|---|
| 2006/0189891 A1* | 8/2006 | Waxman | A61B 10/04 600/564 |
| 2014/0005478 A1* | 1/2014 | Kennedy, II | A61B 1/00066 600/114 |
| 2020/0246045 A1* | 8/2020 | Nakao | A61B 1/00133 |

\* cited by examiner

*Primary Examiner* — Rene T Towa

(57) ABSTRACT

An endoscope biopsy instrument includes a scamming sub assembly located at a proximal end of a handle and adapted to rotate an elongate needle shaft member during an axial motion of an outer handle member and the elongate needle shaft member relative to an inner handle member. Two key elements extend outwardly from a stylist member into corresponding helical guide grooves with interleaved windings in an inner surface of the inner handle member. The helical guide grooves are located within a proximal end portion of the inner handle member and extend from a proximal end of the inner handle member to a point located intermediately along the inner handle member. The helical guide grooves, of the inner handle member, are parallel and accordingly have the same screw pitch. The stylist is rotatably connected at a proximal end to a proximal end of the outer handle member and is affixed at a distal end to the needle shaft member.

5 Claims, 17 Drawing Sheets

ROTATING FINE NEEDLE CORE BIOPSY DEVICE WITH IMPROVED CAMMING SUBASSEMBLY

FIELD OF THE INVENTION

This invention relates to a medical instrument that may be used in minimally invasive procedures. The instrument or device is exemplarily configured for insertion through or deployment via a working channel of a flexible endoscope.

An instrument in accordance with this invention is utilizable with an ultrasound-endoscope, for performing a trans-luminal needle biopsy on a patient's internal body tissues at a surgical site not visible to the unaided eye.

The instrument of this invention facilitates the performance of a fine needle biopsy (FNB)—obtaining a core tissue biopsy instead of a fine needle aspiration (FNA)—wherein a number of singular cells are aspirated from morselized tissue. Obtaining an entire core biopsy of tissue is made possible due to the camming-rotation handle design of the invention in combination with the special configuration of the elongate flexible needle assembly, such that when deployed, the needle is plunged into the lesion to be sampled, advancing both in an axial and a rotary fashion.

BACKGROUND OF THE INVENTION

Fine needle aspiration (FNA) has been a widely accepted method for obtaining tissue samples for histologic analysis in diagnosing tumors of extra-luminal soft tissue organs through endoscopic ultrasound-guided fine needle aspiration (EUS-FNA).

Conventional surgical techniques for obtaining tissue samples accessible only through a flexible ultrasound-endoscope using a fine needle generally require numerous (15-30) needle passes. Collectively called "the woodpecker technique", these numerous needle passes cause morselization, or liquefication of a tumor or other pathologic lesion, enabling subsequent aspiration of cells through the needle of an FNA instrument. These procedures often result in obtaining merely a small number of cells, which may or may not be diagnostic. Such procedures are often traumatic to patient organs due to the multiple needle plunges necessary to liquefy and aspirate cells.

The current technique used during EUS-FNA of a tumor entails passing an 18-to-22-gauge stainless steel needle into a suspected tumor. This needle is passed through the working channel of a linear echo endoscope under real-time guidance into the endosonographically visualized mass. The needle is moved back and forth into the lesion to be sampled, while suction is being applied. The specimens obtained are subsequently placed onto a slide, and immediately examined by a pathologist, who must be present during every such procedure to assess if any malignant cells were obtained.

Aspirating a sample through a needle from a fluid medium is a simple procedure. Aspirating a sample from a solid mass is difficult. It is for this reason that multiple needle plunges are necessary to morselize the sought-after tissue before aspirating. Most EUS-FNA procedures take up to 30 needle passes to make a definitive pathologic diagnosis. Oftentimes, the only cells that are obtained are blood cells or normal tissue cells. In such a case, the procedure is repeated until one or more abnormal cells are detected by the pathologist.

U.S. Pat. No. 7,722,549 discloses an instrument that includes a rotating needle for taking core biopsies of extraluminal internal organs. Pursuant to the invention of U.S. Pat. No. 7,722,549, the needle automatically rotates while being advanced into a lesion, thus garnishing a core biopsy. However, after extensive in vitro animal organ trials, inconsistencies in the size and reliability of the specimens to provide for all diagnostic parameters were noted. Thus, the instrument pursuant to the teachings of U.S. Pat. No. 7,722,549 has not provided optimal sampling for clinical purposes. The rotating and advancing stroke of the biopsy needle is evidently too abbreviated. The location of the camming assembly within the distal aspect of the biopsy needle is complicated to manufacture because of the restricted space inside the needle lumen and interferes with operator control of the biopsy procedure. In addition, the design of the stylist in U.S. Pat. No. 7,722,549 adversely affects reliability and performance.

OBJECTS OF THE INVENTION

An object of the present invention is to provide an improved medical instrument of the type disclosed in U.S. Pat. No. 7,722,549.

A more particular object of the present invention is to provide a design for a device that will consistently function to obtain fine needle core biopsies at every needle pass, providing excellent tissue quality and quantity necessary for the performance of multiple pathologic tests. It is an important object of the present invention to provide a device, that upon deployment of the biopsy needle into a target tissue, a combination of forward or axial combined with rotational movement of the needle consistently brings about the garnishing of a sizable biopsy specimen, both in length and diameter, enabling the multiple tissue examinations necessary for the assessment of histochemical, immunohistochemical, flow cytometric, electron microscopic, genetic and genomic parameters, in order to diagnose and classify a malignancy if present, determine tumor type, and assess growth rate or grade, or diagnose other anomalies of the biopsied organ tissue.

It is a further object of this invention, that said device handle must be of a similar in size, dimensions, and appearance as the FNA aspiration devices on the market, whereby the device of the present invention, having the same manner of attachment to the echo endoscope as the other FNA devices, has the same manner of actuation of the device handle to cause a full needle actuation and deployment into a target tissue.

Another particular object of the device of this invention is that it be easily adjustable to the various echo-endoscope-shaft lengths, so that upon full needle passage into a target tissue-a smooth and seamless combination of axial and rotational movement of the device's needle is brought about.

It is a further object of this invention that the needle of the invention is never deformed, even upon extreme bending of the endoscope shaft housing, or during passage and deployment of said needle through a maximally bent endoscope shaft.

These and other objects of the invention will be apparent from the drawings and descriptions herein.

SUMMARY OF THE INVENTION

This invention in part facilitates fine needle biopsy (FNB), such as that disclosed in U.S. Pat. No. 7,722,549, by providing a needle member that is optimally rotatable as it is being advanced, so that when passed into a target tissue it moves forward axially and rotatably.

A medical instrument in accordance with the present invention is adapted for use in conjunction with a flexible endoscope. Such an endoscope comprises a flexible elongate insertion member having a bendable and steerable segment with a proximal end located a first predetermined distance from a distal tip of the elongate insertion member, the insertion member having a biopsy or working channel. A medical instrument pursuant to a feature of the present invention comprises an elongate tubular sheath member, an elongate needle shaft member, an actuator handle subassembly that includes a camming subassembly.

The elongate tubular sheath member has a diameter sufficiently small so that the sheath member is slidably disposable in the biopsy or working channel of the elongate insertion member of the flexible endoscope. The sheath member has an opening at a distal tip, the opening typically extending in a plane at least partially transverse to a longitudinal axis of the sheath member.

The elongate needle shaft member longitudinally traverses at least a substantial portion of the elongate tubular sheath member. The elongate needle shaft member preferably includes a first elongate flexible tubular segment, a second elongate flexible tubular segment typically including a hollow needle, and a connector segment. The first elongate flexible tubular segment is preferably made at least predominantly of braided filaments of stainless steel and is effectively rigid in torsion so as to exhibit a 1:1 rotation from one end to an opposite end.

Preferably, the second elongate flexible tubular segment is made of Nitinol and has a length less than one-fourth of the length of the first elongate tubular segment. The connector segment is bonded on one side to an end of the first elongate flexible tubular segment, namely the stainless-steel braided segment, and on an opposite side, to an end of the second elongate flexible tubular segment, the Nitinol needle. The second elongate flexible tubular segment or hollow needle has a pointed tip.

Ideally, the connector segment has a length (a) sufficiently great to bond the braided stainless-steel filamentary material of the first elongate flexible tubular segment to the Nitinol (NiTi) material of the second elongate flexible tubular segment—the hollow needle and (b) sufficiently small, or minimized, to maintain flexibility of the elongate needle shaft member so that a portion of the elongate needle shaft member including the connector segment can be inserted through the bendable steerable flexible insertion member of the endoscope when the bendable steerable flexible insertion member is configured in a maximally angled or bent configuration.

The actuator handle subassembly has an inner handle member and an outer handle member. The outer handle member is slidably disposed over a proximal end of the inner handle member. The outer handle member is operatively connected at least indirectly to a proximal end of the elongate needle shaft member for longitudinally moving the elongate needle shaft member relative to the inner handle member so that the pointed tip may be shifted from a location inside the elongate tubular sheath member to a position located distally beyond a distal end of the elongate tubular sheath member.

The present invention provides a camming subassembly modified relative to that of U.S. Pat. No. 7,722,549 to provide a core biopsy of consistently increased length, diameter, and integrity for the multiple pathologic examinations necessary to make a correct and detailed diagnosis. The present camming subassembly is provided with cooperating camming structures in part mounted onto the outer handle member and in part disposed on the inner handle member. The redesigned cooperating camming structures are located at the proximal end of the handle and are adapted to rotate the elongate needle shaft member during an axial motion of the outer handle member and the elongate needle shaft member relative to the inner handle member. The camming subassembly comprises at least one and preferably two key elements and at least one and preferably two corresponding helical guide grooves, the key elements projecting into respective ones of the helical guide grooves of the inner handle member. The helical guide grooves are located within a proximal end portion of the inner handle member and extend from a proximal end of the inner handle member to a point located intermediately, preferably approximately halfway along the inner handle member. The helical guide grooves have interleaved windings. The helical guide grooves of the inner handle member are parallel and accordingly have the same screw pitch.

An axial force applied to the outer handle member shifts the outer handle member in an axially distal direction from a proximally extended position relative to the inner handle member and causes the elongate needle shaft member, including the operative element to advance in the axial direction. In a longest possible stroke of the outer handle member relative to the inner handle member, the relative axial motion concurrently effects preferably an at least a 540° rotation of the operative element. The present design of the camming structures enables the desired 540° rotation while maintaining an acceptable handle length and shape equal to that of all other devices used in conjunction with the endoscope for needle aspiration. While it is possible to deviate from the 1½ rotation, the present invention contemplates that a 540° rotation of the elongate needle shaft member including the hollow needle (owing to 1:1 rotation of the needle shaft member) produces a biopsy specimen of sufficient diameter, length, and preservation of cellular architecture enabling performance of the multiple pathologic examinations necessary for a detailed and precise diagnosis, tissue typing, and proper local staging of the disease.

In an instrument as disclosed herein that incorporates the present invention, the actuator handle subassembly includes a luer cap slidably disposed over a distal end portion of the inner handle member. The inner handle member is provided along an outer surface with a longitudinal groove of predetermined length, the longitudinal groove having abutments or stops at opposite ends. The lure cap has a key projection extending into the longitudinal slot. The key projection rotatably fixes the lure cap to the inner handle member, while permitting limited longitudinal movement of the lure cap relative to the inner handle member. The lure cap is provided with a set screw engageable with the inner handle member for releasably fixing the lure cap to the inner handle member. Shifting of the lure cap from one position to another along the longitudinal groove and concomitantly longitudinally along the inner handle member, as guided or delimited by the key projection extending into the longitudinal groove, changes an effective length of the elongate tubular sheath member, thereby enabling use of the present medical instrument with endoscopes of different lengths.

The key projection preferably extends from a key member that is affixed to the lure cap via at least one screw, while one of the abutments or stops located at a distal end of the longitudinal groove finds implementation in a portion of a journal element attached to the inner handle member and inserted in part in an opening at a distal end of the inner handle member. The elongate tubular sheath member extends into the journal element, or sheath anchor bushing, and is affixed thereby to the inner handle member, while the journal element may be provided with tongue or finger extending radially to and coextensive with the longitudinal groove.

Pursuant to another feature of the present invention, the actuator handle subassembly further includes an elongate stylist member that is (i) disposed inside the inner handle member, (ii) rotatably connected at a proximal end to the outer handle member, and (iii) fixedly connected to a proximal end portion of the elongate needle shaft member, for longitudinally moving the elongate needle shaft member relative to the inner handle member so that the pointed tip may be moved distally beyond a distal end of the elongate tubular sheath member. This movement causes the needle to plunge into tissue with its dual rotary and axial movement, obtaining consistently hefty tissue biopsy at every needle pass. The stylist member has a length substantially longer than one half of the length of the outer handle member. The stylist member is located within both the inner handle member and the outer handle member. The stylist member equipped with its key elements, the outer handle member, and the helical grooves on the inside surface of the inner handle member form the camming subassembly that generates rotary motion of the needle shaft member during a manually induced, axially directed shifting of the outer handle.

The camming subassembly as disclosed herein, including the elongate stylist, the dual helical grooves, and the location thereof at the proximal end of the handle assembly provide a smooth and sure motion of the needle shaft member. Moreover, the design of the camming subassembly as disclosed herein enables, without an unduly long handle, an automatic rotation of at least 540° of the needle together with the forward axial movement during a biopsy procedure, yielding a large, smooth, and continuous specimen desirable for a multifaceted detailed pathologic examination.

A fine-diameter medical device as disclosed herein facilitates obtaining core tissue biopsies, because the device is not subject to warping or deformation owing to its being passed through and along an arcuate path, and because the fine-diameter elongate member is rotatable, concurrent 1:1 with the rotation effected by the handle.

A fine-diameter medical needle as disclosed herein is useful for collecting a core tissue biopsy from internal organs situated extraluminally to the gastrointestinal track. The device as disclosed herein may also be used for lung biopsies, to sample lesions that are located extraluminally to the upper respiratory tract. The needle of this assembly requires only a minimal number of gentle passes into a target tissue, thereby reducing undue trauma to the internal organs biopsied, and avoiding possible tumor dissemination.

A biopsy instrument in accordance with the present invention is specifically designed to take substantial core biopsies the likes of which have not been achieved by all conventional tissue sampling devices, while having the same shape and sized handle as the other devices, taking into account the limitations, dimensions, and uses of the echo, or ultrasound endoscope.

DETAILED DESCRIPTION

Figure 1:
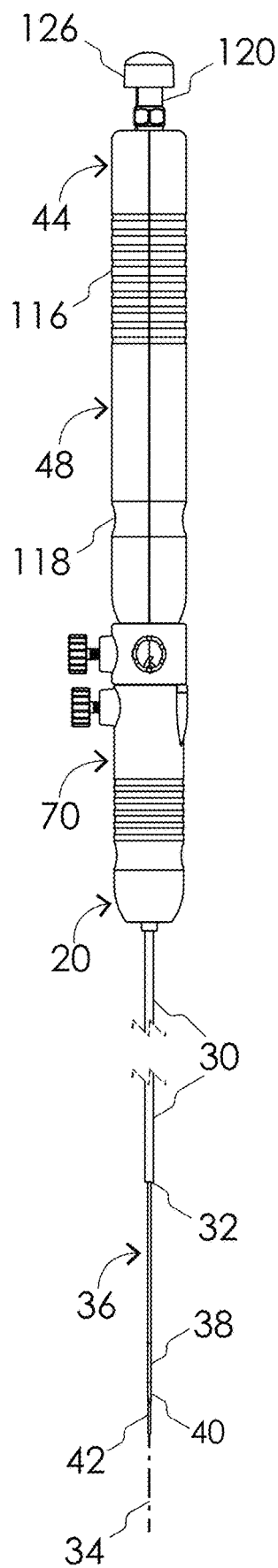
FIG. 1 is a side elevational view of a medical instrument in accordance with the present invention.
Figure 2:
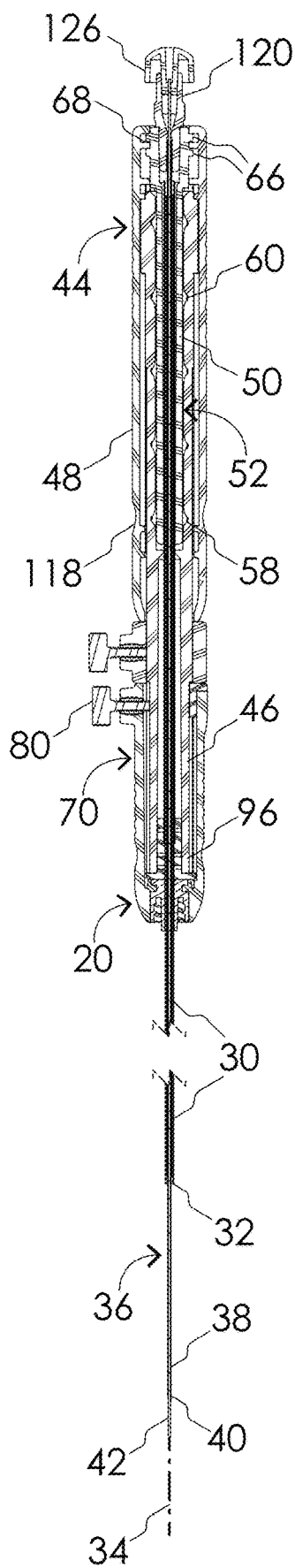
FIG. 2 is a longitudinal cross-sectional view of the medical instrument of FIG. 1, taken in the plane of FIG. 1.

FIGS. 1 and 2 depict a medical instrument for use in conjunction with a flexible endoscope, preferably an ultrasound upper gastrointestinal endoscope, that comprises a flexible elongate insertion member having a biopsy or working channel. The medical instrument comprises a handle assembly 20 and an elongate tubular sheath member 30 having a diameter sufficiently small so that the sheath member is slidably disposable in the biopsy or working channel of the elongate insertion member of the flexible endoscope. Tubular sheath member 30 has an opening at a distal tip 32, the opening (not separately designated) extending in a plane at least partially transverse to a longitudinal axis 34 of the tubular sheath member.

An elongate needle shaft member 36 passes longitudinally through tubular sheath member 30. Needle shaft member 36 includes, at a proximal end, an elongate flexible tubular segment 38 and, at a distal end, an operative element in the form of a hollow needle 40 with a pointed tip 42. Flexible tubular segment 38 is made of braided filaments of stainless steel and is effectively rigid in torsion in order to exhibit a 1:1 rotation from one end to an opposite end when a torsional or twisting force is applied to the flexible tubular segment. Hollow needle 40 is made of Nitinol (NiTi) and has a length considerably less than the length of flexible tubular segment 38, for instance, a length less than one-fourth of the length of flexible tubular segment 38.

An actuator handle subassembly 44 includes a tubular inner handle member 46 and a tubular outer handle member 48. Outer handle member 48 is slidably disposed over a proximal end portion (not separately designated) of inner handle member 46. Outer handle member 48 is rotatably connected to a proximal end of an elongate stylist member 50 disposed inside inner handle member 46 and fixedly connected at a distal end to a proximal end of needle shaft member 36. Elongate stylist member 50 is longer than one half of the length of outer handle member 50. With this structure, a user longitudinally moving needle shaft member 36, and concomitantly, hollow needle 40, relative to inner handle member 46, can position pointed tip 42 of hollow needle 40 distally beyond a free end of tubular sheath member 30.

Camming assembly 52, including outer handle member 48 and stylist member 50, is so structured that an axial force applied to outer handle member 48 that shifts the outer handle member in a distal direction from a proximally extended position, i.e., pulled back relative to inner handle member 46, causes needle shaft member 36 to advance in the axial direction, while concurrently effecting a rotation of the operative element, thereby producing a combination axial and rotary motion of the operative element. Needle 40 has at least one sharp edge (not shown) owing to a beveling of the needle that results in sharp tip 42. Helical groove or grooves 58 and 60 of camming assembly 52 have a number of windings and a winding pitch adapted to effectuate a suitable rotation (e.g., a full rotation) of elongate needle shaft member 36 including the operative element or needle 40 during a complete axial stroke of outer handle member 48 relative to inner handle member 46 from a retracted position proximally displaced relative to the inner handle member, wherein stylist member 50 is disposed partially outside of the inner handle member, to a distally forwardmost position wherein a smaller portion of the stylist member is disposed outside of the inner handle member. In the distally forwardmost, or maximally forward, position of stylist member 50 and outer handle member 48, elongate cylindrical shaft portion 62 of the stylist member is fully disposed inside inner handle member 46, while enlarged cylindrical section 64 of the stylist member remains outside the inner handle member. The co-functioning components of handle assembly 20 exhibit dimensions that effectuate a 540° degree rotation of stylist member 50 and needle shaft member 36 relative to inner handle member 46 during axial advance of stylist member 50 and needle shaft member 36. The resulting simultaneous axial advance and rotational motion of stylist member 50 together with needle shaft member 36 ensures that a the obtained biopsy specimen is complete, consisting of a substantial, preferably uninterrupted portion of the abnormal lesion that is being examined, is smoothly cylindrical, and has a form suitable for the required microscopic, immunologic, histochemical, flow cytometric, genetic and genomic examinations.

Camming assembly 52, including outer handle member 48 and stylist member 50, is so structured that an axial force applied to outer handle member 48 that shifts the outer handle member in a distal direction from a proximally extended position, i.e., pulled back relative to inner handle member 46, causes needle shaft member 36 to advance in the axial direction, while concurrently effecting a rotation of the operative element. Needle 40 has at least one sharp edge (not shown) owing to a beveling of the needle that results in sharp tip 42. Preferably, the co-functioning components of handle assembly 20 exhibit dimensions in order to effectuate an at least 540° degree rotation of stylist member 50 and needle shaft member 36 relative to inner handle member 46. This ensures that a harvested biopsy specimen has a smooth cylindrical form suitable to produce multiple biopsy sections for respectively optimal tissue tests.

Figure 5:
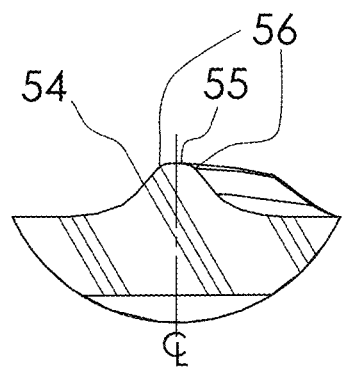
FIG. 5 is a partial cross-sectional view taken along line V-V in FIG. 3liuy, showing one of two key elements disposed on diametrically opposed sides of the stylist.
Figure 6:
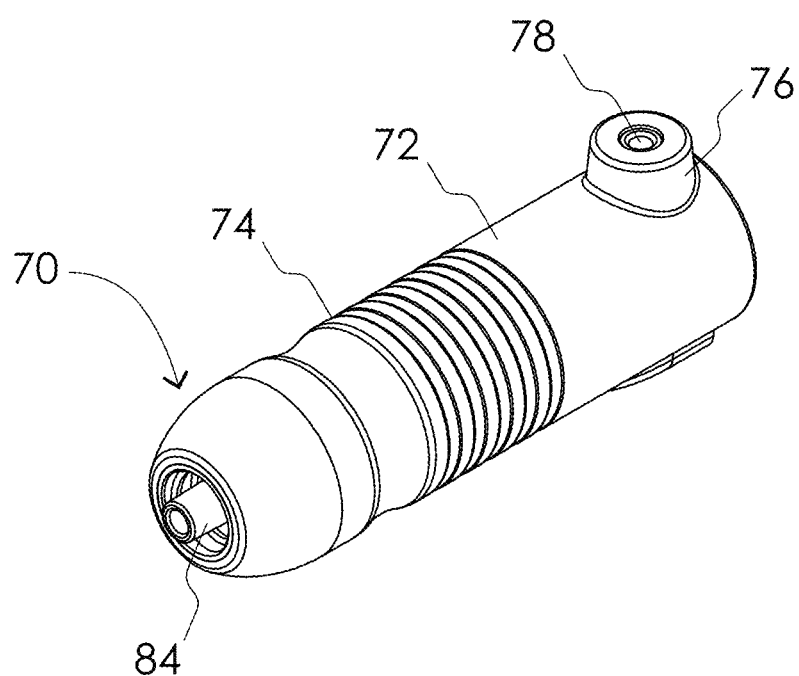
FIG. 6 is a top, front or distal-end, and right-side perspective view of a lure cap shown in FIGS. 1 and 2.
Figure 7:
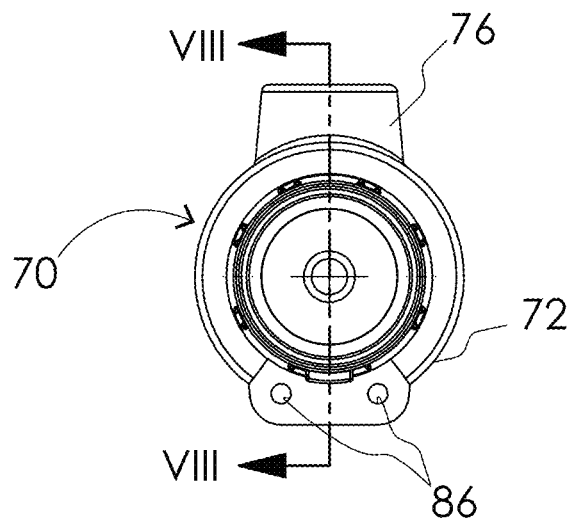
FIG. 7 is a rear or proximal-end view of the lure cap of FIG. 6.
Figure 8:
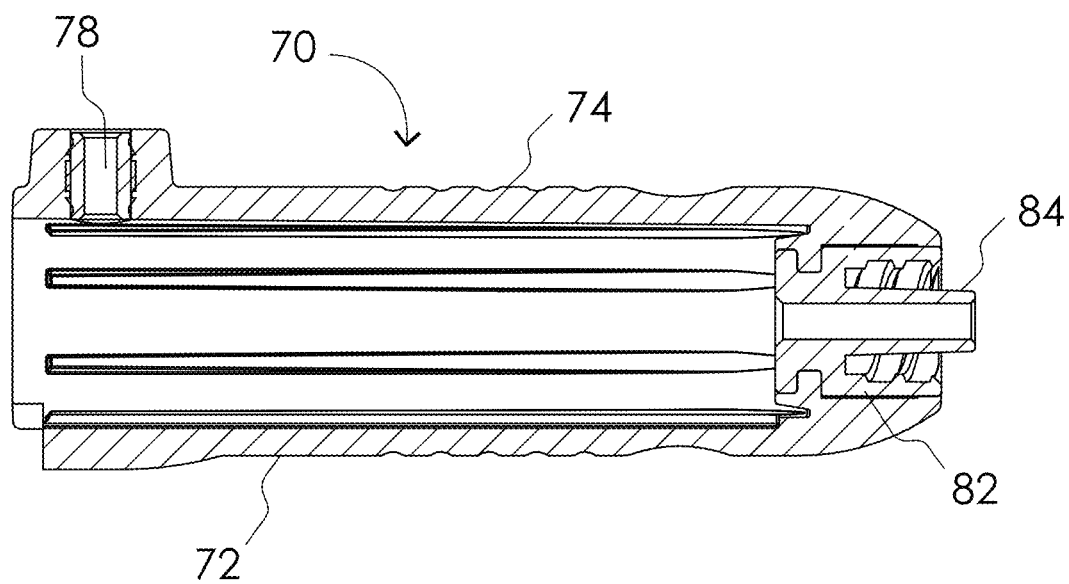
FIG. 8 is a longitudinal cross-sectional view taken along line VIII-VIII in FIG. 7.

As depicted in FIG. 5, each outwardly projecting key element 54 has a generally triangular cross-section that is truncated along a spiraling outer end to present a flat 55 with two opposing edges 56 that are rounded rather than sharp, thereby preventing key element 54 from biting into the surfaces of grooves 58 and 60. This feature contributes to the ease of use and reliability of the biopsy device. The rounding of the key elements 54 may be so pronounced that flat 55 has a humped or arcuate form in its entirety. In brief, each key element 54 has a rounded profile along its spiraling outer end.

Figure 3:
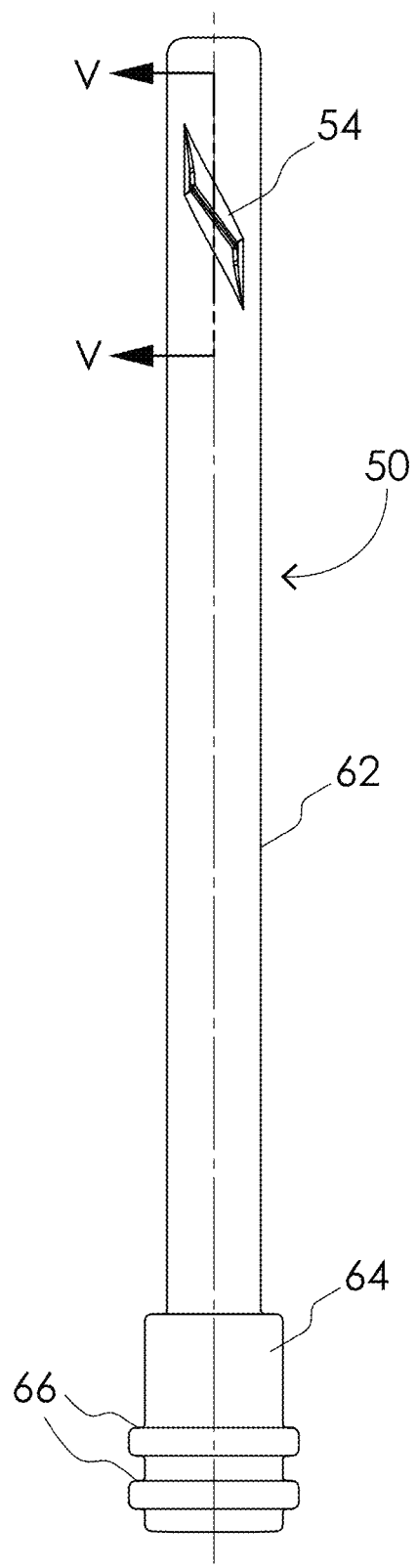
FIG. 3 is a side elevational view of a stylist shown in cross-section in FIG. 2.
Figure 4:
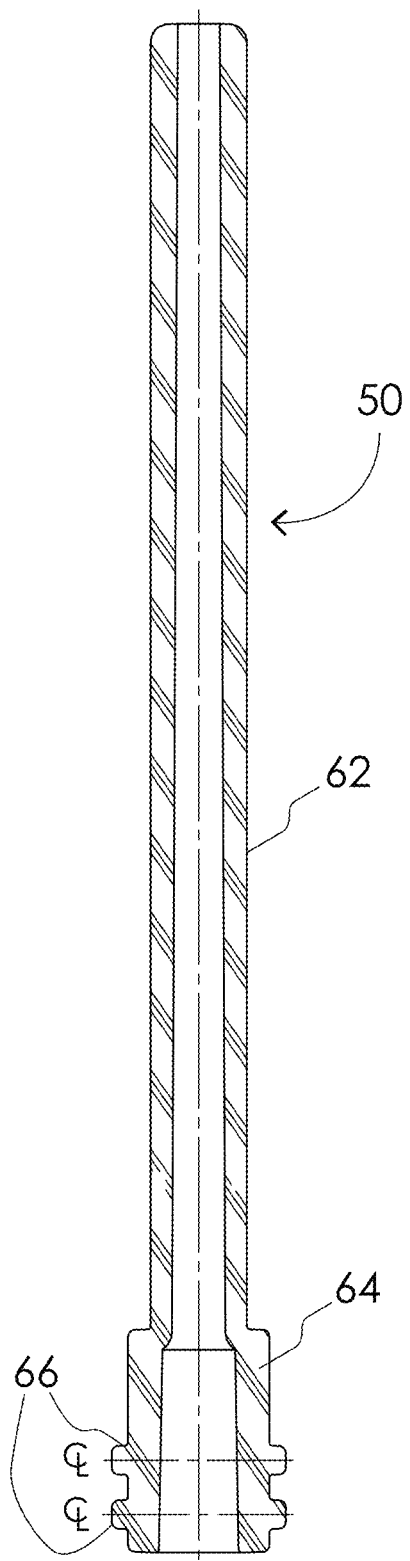
FIG. 4 is a longitudinal cross-sectional view of the stylist of FIG. 3, taken in the plane of FIG. 3.

As shown in FIGS. 3, 4, and 5, stylist member 50 has an elongate cylindrical shaft portion 62 with an enlarged cylindrical section 64 at a proximal end. A pair of mutually spaced annular beads 66 along an outer surface of enlarged cylindrical section 64 flank an inwardly projecting annular ridge 68 on an inside surface of outer handle member 48, whereby the proximal end of stylist member is rotatably seated inside and longitudinally locked to outer handle member 48.

As illustrated in FIGS. 2 and 6-8, actuator handle sub assembly 44 further includes a lure cap 70 slidably disposed over a distal end portion (not designated) of inner handle member 46. Luer cap 70 has a cylindrical body 72 with external ribbing 74 for finger-grip enhancement and a port 76 at a proximal end with a threaded through hole 78 receiving a set screw 80 (FIG. 1) for use in releasably fixing the position of the lure cap relative to inner handle member 46. At a distal end, lure cap 70 has an insert 82 with a projecting tube stub 84 traversed by elongate sheath member or catheter 30. At a proximal end, lure cap 70 has a flat 84 with two mutually spaced threaded holes 86.

Figure 12:
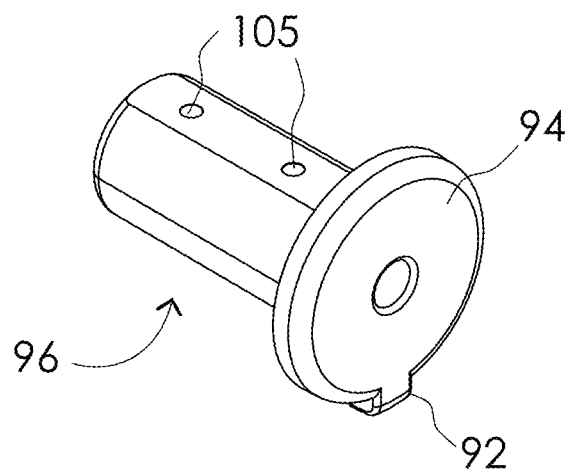
FIG. 12 is a front or distal-end, top and left side perspective view of a sheath anchor bushing shown in FIG. 2.
Figure 13:
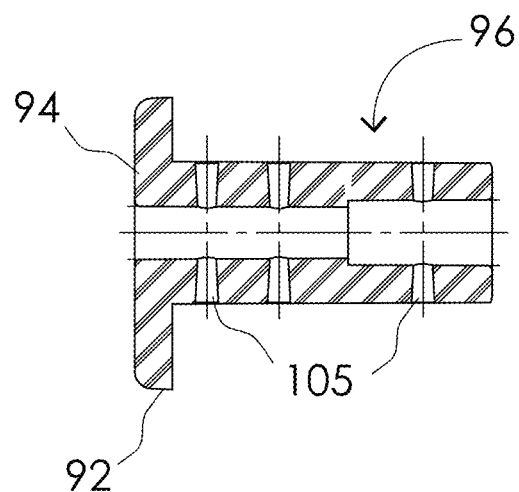
FIG. 13 is a longitudinal cross-sectional view of the sheath anchor bushing of FIG. 12.
Figure 14:
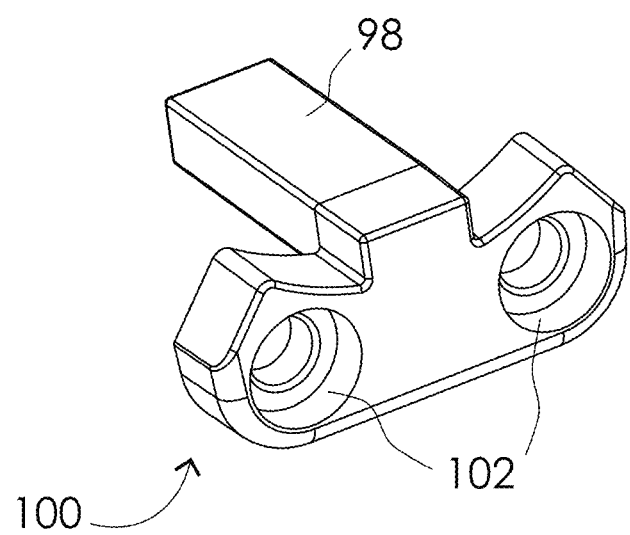
FIG. 14 is a rear or proximal-end, top and right-side perspective view of a key element affixed by screws to a proximal side of the lure cap of FIGS. 1, 2, and 6-8.

For rotationally fixing lure cap 70 to inner handle member 46, the inner handle member is provided along an outer surface with a longitudinal slot 88 of predetermined length. See FIGS. 9-11. Longitudinal slot 88 has abutments or stops 90 and 92 at a proximal end and a distal end, respectively, wherein stop 92 is formed as a portion of a sheath anchor bushing or journal member 96, as illustrated in FIGS. 12 and 13. For instance, stop 92 may take the form of a finger projecting radially from a flange 94. Rotational fixation of lure cap 70 to inner handle member 46 is achieved in part by a key projection 98 (FIG. 14) extending from lure cap 70 into longitudinal slot 88. Key projection 98 additionally cooperates with abutments or stops 90 and 92 at the ends of slot 88 to define the maximal range of longitudinal positioning of lure cap 70 along inner handle member 46.

Set screw 80 is engageable with inner handle member 46 for releasably fixing lure cap 70 to inner handle member 46. Shifting of lure cap 70 from one longitudinal position to another along inner handle member 46 and concomitantly shifting of key projection 98 along elongate groove 88 changes an effective length of elongate tubular sheath member 30. Tubular sheath member 30 is affixed to inner handle member 46, so that sliding of lure cap 70 in a distal direction relative to inner handle member 46 extends the lure cap over a proximal portion of the tubular sheath member, thereby decreasing a maximal length of insertion of the tubular sheath member into an endoscope biopsy or working channel.

Key projection 98 extends away from a planar body (not separately designated) of a key member 100 (see FIG. 14) screwed to lure cap 70 via apertures 102 in the key member and holes 86 in lure cap flat 84.

Figure 9:
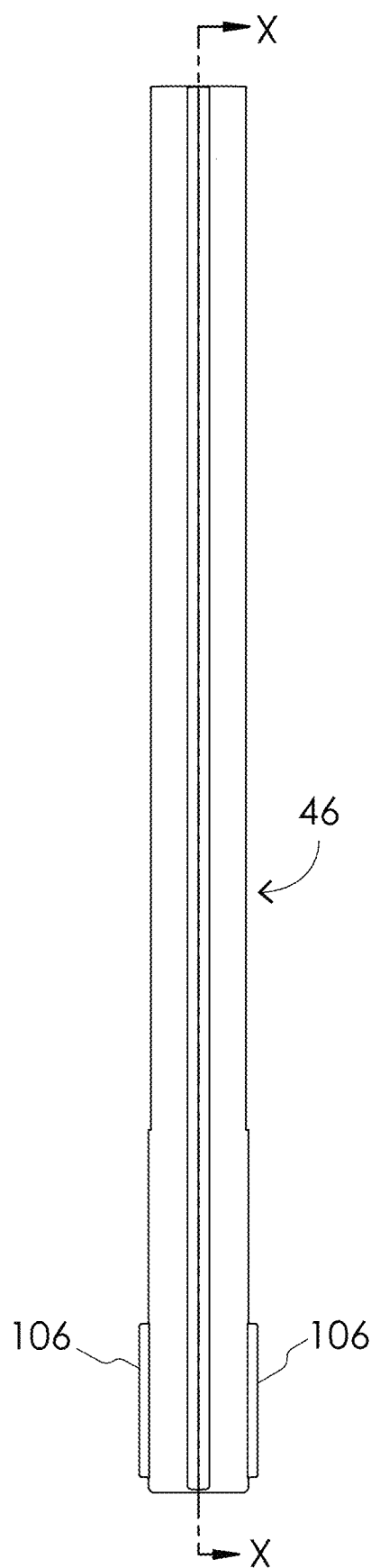
FIG. 9 is a side elevational view of an inner handle member shown in FIG. 2.
Figure 10:
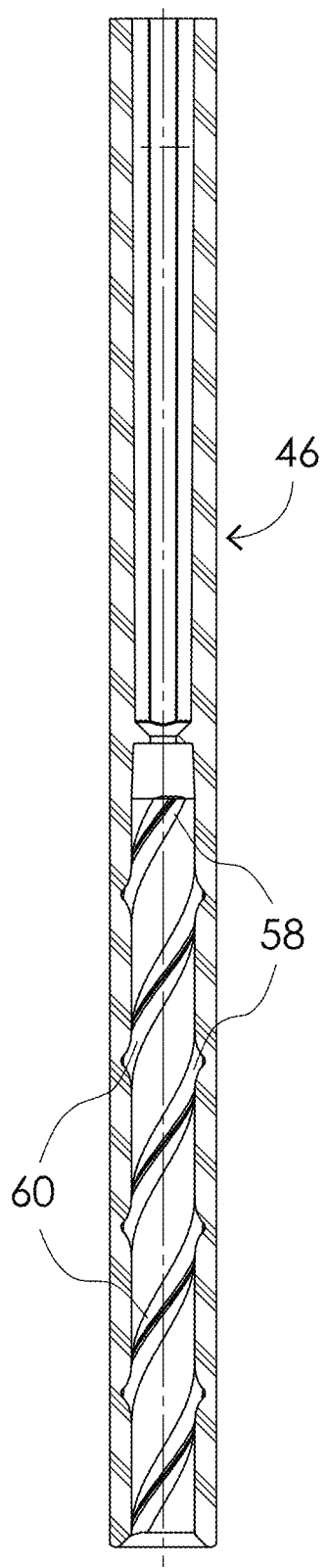
FIG. 10 is a longitudinal cross-sectional view of the inner handle member of FIGS. 2 and 9, taken in the plane of FIG. 9.
Figure 11:
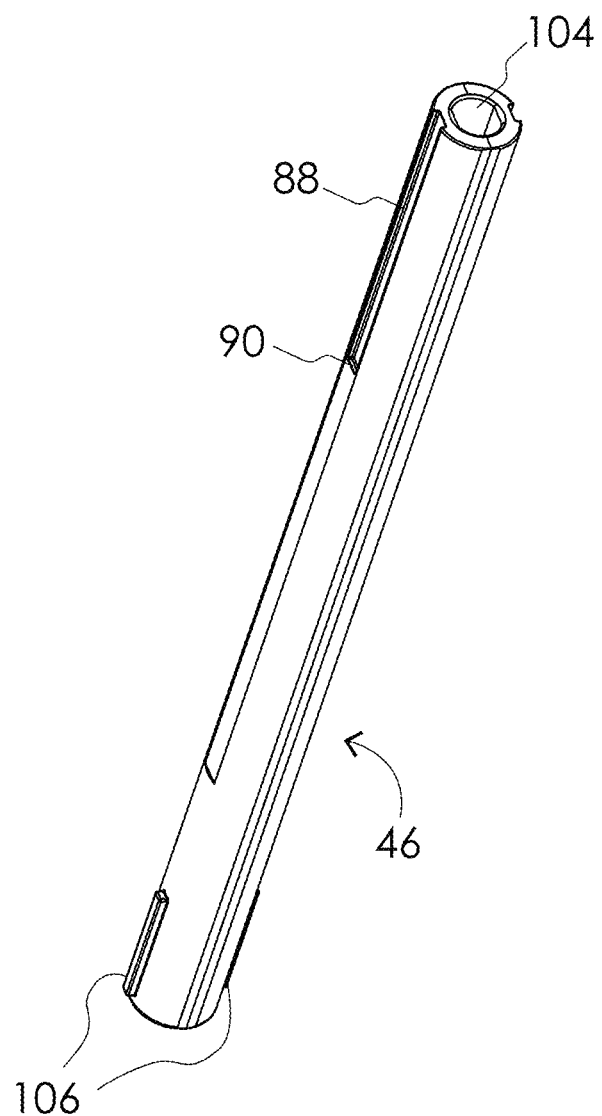
FIG. 11 is a top, front or distal-end, and left side perspective view of the inner handle member of FIGS. 2, 9, and 10.

Sheath anchor bushing or journal element 96 (FIGS. 12 and 13) is disposed in part in an opening 104 at a distal end of inner handle member 46 (FIGS. 9-11). Flange 94 lies against a distal annular rim of inner handle member 46. Needle shaft member 36 traverses sheath anchor bushing or journal element 96, while tongue or finger 92 extends to longitudinal groove 88 and forms the distal end stop or abutment of the longitudinal groove. Tubular sheath member 30 is affixed to inner handle member 46 via sheath anchor bushing 96. To that end, sheath anchor bushing is provided with multiple tapered holes 105 (FIGS. 12, 13) for receiving pins (not shown) to anchor or entrain tubular sheath member 30, thereby affixing the tubular sheath member to inner handle member 46.

Figure 15:
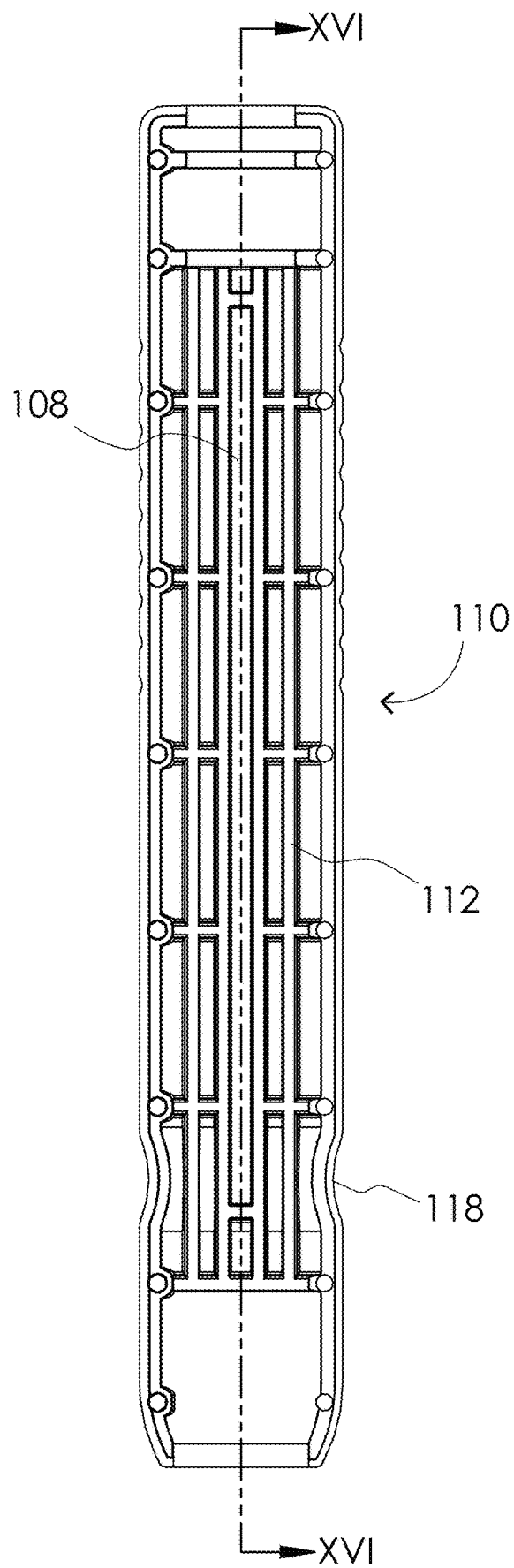
FIG. 15 is a medial longitudinal cross-sectional view of an outer handle member illustrated in FIGS. 1 and 2, showing an inner surface of one of two identical half sections of the outer handle member.
Figure 16:
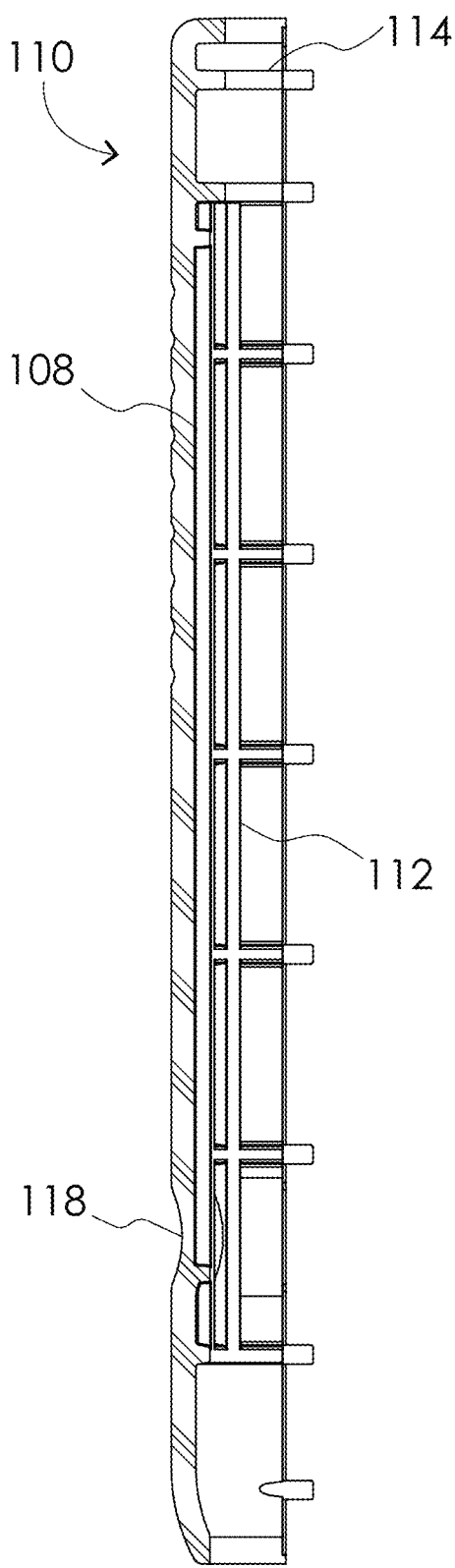
FIG. 16 is a longitudinal cross-sectional view of the outer handle member half section of FIG. 15, taken along line XVI-XVI in FIG. 15.
Figure 17:
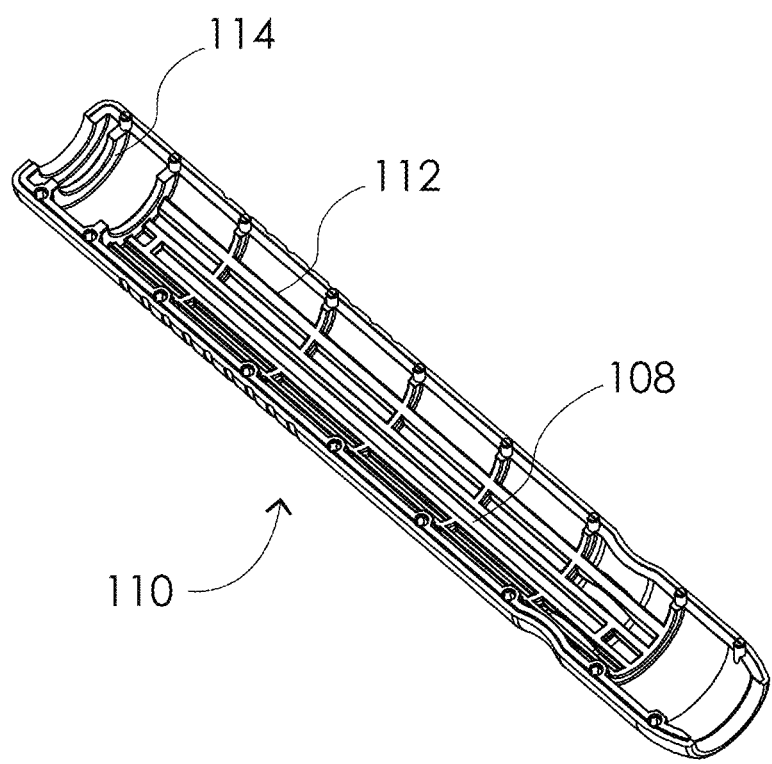
FIG. 17 is a perspective view of the outer handle member half section of FIGS. 15 and 16, also showing the inner surface depicted in FIG. 15.
Figure 18:
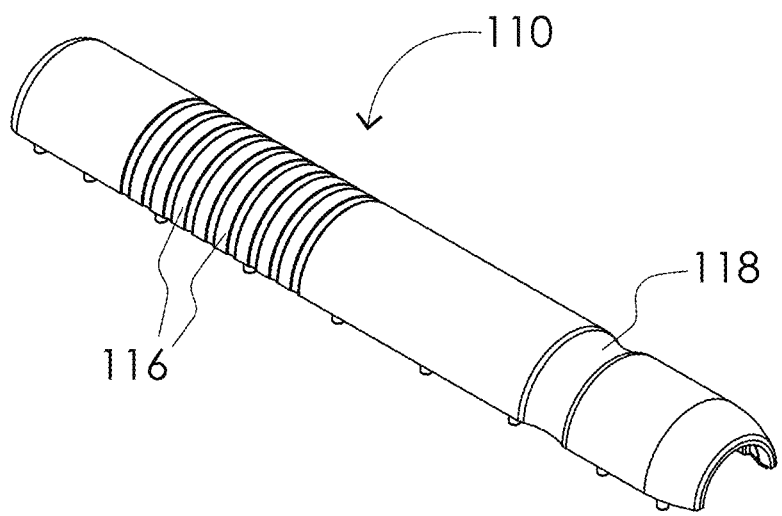
FIG. 18 is a perspective view showing the outer surface of the outer handle member half section of FIGS. 15-17.
Figure 19:
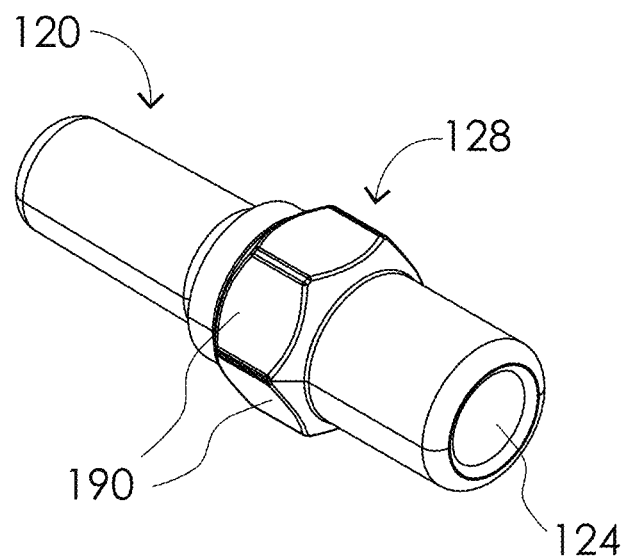
FIG. 19 is a proximal-end and side perspective view of a proximal lure element shown in FIG. 2.
Figure 20:
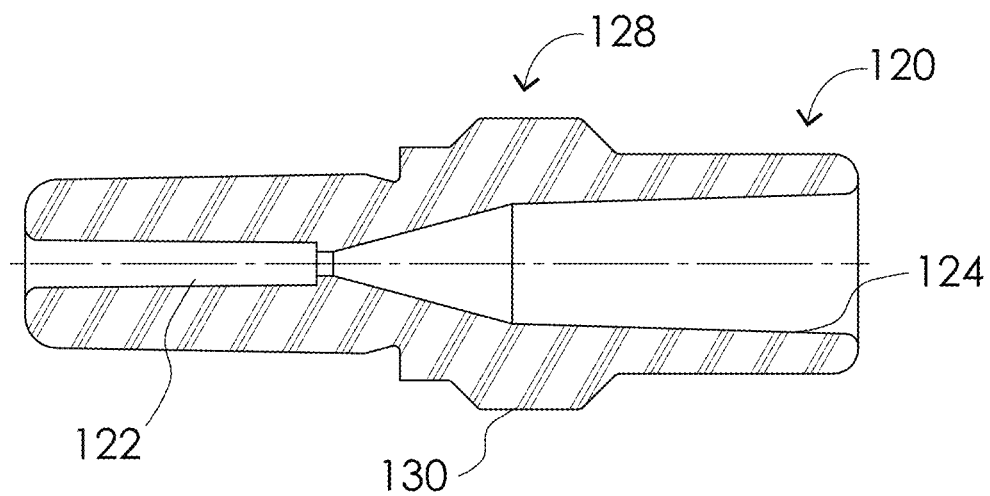
FIG. 20 is a longitudinal cross-sectional view of the proximal lure element of FIG. 19.

As shown in FIGS. 9-11, inner handle member 46 is formed at a proximal end with two diametrically opposed and outwardly and longitudinally extending elongate fins or beads 106. These fins 106 are slidably inserted into respective elongate longitudinal channels 108 (FIGS. 15-17) provided along an inner surface of outer handle member 48. Fins 106 and channels 108 rotationally fix outer handle member 48 to inner handle member 46 while permitting a limited range of relative longitudinal motion. Thus, outer handle member 48 may be alternately shifted (i) in a proximal direction, drawing needle shaft member 36 including hollow needle 40 back into tubular sheath member 30, and (ii) in a distal direction, moving the needle shaft member and the hollow needle out of the tubular sheath member and into target tissue inside a patient.

As depicted in FIGS. 15-18, outer handle member 48 comprises generally hemi-cylindrical half shells 110 each formed along an inner surface with a rectilinear grid of reinforcement ridges 112, a respective one of longitudinal channels 108, and a semi-annular inwardly extending shallow flange 114 at a proximal or rear end of outer handle member 48. Flanges 114 are joined together, upon assembly of outer member 48 together with stylist 50, to form inwardly projecting annular ridge 68 that is received between outwardly projecting spaced annular beads 66 on enlarged cylindrical section 64 of the stylist 50. Outer handle member 48 is formed along an outer surface with an array of circular indentations 116 and an annular recess 118 that facilitate gripping and manipulation of the outer handle member, as well as handle assembly 20 in its entirety.

As illustrated in FIGS. 1, 2, 19, and 20, a proximal lure 120 is connected or bonded to the proximal end of stylist 50 and serves in part to fixedly connect a proximal end of needle shaft member 36 to the stylist. Proximal lure 120 exhibits a distal-end bore 122 that receives needle shaft member 36 and a larger tapered proximal-end recess 124 that removably receives a knob 126 (FIGS. 1 and 2) attached to a proximal end of a stylet wire (not separately illustrated). Knob 126 is mounted to proximal lure 120, for instance, by a friction fit, to temporarily anchor the stylet (not shown) so that the stylet closes or blocks a lumen (not designated) of needle shaft member 36 until a desired biopsy site is reached during an instrument deployment procedure. At that time, knob 126 is grasped and removed from proximal-end recess 124 and used to retract the stylet at least from a distal end portion of needle 40. Preferably, the stylet remains for the most part within the instrument during a biopsy procedure; after the instrument is withdrawn from the patient, knob 126 is used to push the stylet wire along needle shaft 36, in a distal direction, to eject the biopsy specimen for diagnostic analysis. Proximal lure 120 is formed on an outer side with a wrenching geometry 128 including six flats 130, for use during a mounting of the proximal lure to stylist 50.

Figure 21:
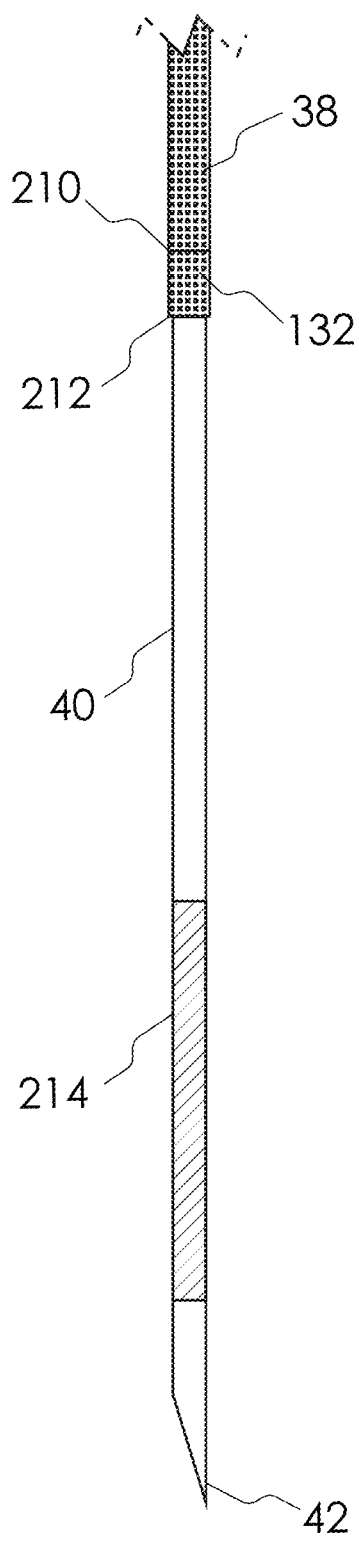
FIG. 21 is partially a longitudinal cross-sectional view and partially a side elevational view of a medical instrument in accordance with the present invention.

As depicted in FIG. 21, elongate needle shaft member 36 includes a connector bushing 132. Connector bushing 132 is bonded (e.g., welded) on one side 210 to a distal end of flexible tubular segment 38 and on an opposite side 212 to a proximal end of hollow needle 40.

As further shown in FIG. 21, Nitinol hollow needle 40 is formed at a free end, opposite connector element 132, with an operative portion such as needle tip 42 (see FIGS. 1 and 2).

What is claimed is:

1. A medical instrument for use in conjunction with an endoscope comprising an elongate insertion member, said insertion member having a biopsy or working channel, said medical instrument comprising:

an elongate tubular sheath member having a diameter sufficiently small, so that said sheath member is slidably disposable in the biopsy or working channel of said elongate insertion member of said endoscope, wherein said sheath member has an opening at a distal tip;

an elongate needle shaft member longitudinally passing through at least a substantial portion of said elongate tubular sheath member, said elongate needle shaft member having, at a distal end an operative element in the form of a hollow needle with a pointed tip and at least one sharp cutting edge, said elongate needle shaft member being rigid in torsion so as to exhibit a 1:1 rotation from one end to an opposite end when a torsional force is applied to said elongate needle shaft member;

an actuator handle sub assembly with an inner handle member and an outer handle member, a proximal end of said elongate tubular sheath member being fixed to said inner handle member, said inner handle member having a proximal end, said outer handle member being slidably disposed over a proximal end portion of said inner handle member, said actuator handle sub assembly including an elongate stylist member (i) disposed inside said inner handle member, (ii) rotatably connected at a proximal end to said outer handle member, and (iii) fixedly connected to a proximal end portion of said elongate needle shaft member for longitudinally moving said elongate needle shaft member distally relative to said inner handle member and said elongate tubular sheath member so that said pointed tip is located beyond a free end of said elongate tubular sheath member; and a camming sub assembly with cooperating camming structures including (i) a pair of outwardly projecting key elements on diametrically opposite sides of said distal end of said elongate rigid stylist member and (ii) a pair of helical grooves with mutually interleaved windings provided on an inner surface of said inner handle member, said outwardly projecting key elements projecting into respective ones of said helical grooves so as to induce said elongate needle shaft member to rotate during an axial motion of said outer handle member and said elongate needle shaft member relative to said inner handle member, said helical grooves (a) being located within said proximal end portion of said inner handle member, (b) starting from said proximal end of said inner handle member, and (c) extending to a point located intermediately along said inner handle member, wherein an axial force applied to said outer handle member shifts said outer handle member in an axially distal direction from a proximally extended position relative to said inner handle member and causes said elongate needle shaft member including said operative element to rotate and advance in the axial direction.

2. The medical instrument defined in claim 1 wherein said elongate needle shaft member has at a proximal end an elongate flexible tubular segment made of braided filaments of stainless steel, and wherein said hollow needle is made of Nitinol.

3. The medical instrument defined in claim 1 wherein said helical grooves have a common number of windings and winding pitch adapted to effectuate an at least 540° degree rotation of said elongate needle shaft member including said operative element during a complete axial stroke of said outer handle member relative to said inner handle member.

4. A medical instrument for use in conjunction with an endoscope comprising an elongate insertion member, said insertion member having a biopsy or working channel, said medical instrument comprising:

an elongate tubular sheath member having a diameter sufficiently small, so that said sheath member is slidably disposable in the biopsy or working channel of said elongate insertion member of said endoscope, wherein said sheath member has an opening at a distal tip;

an elongate needle shaft member longitudinally passing through said elongate tubular sheath member, said elongate needle shaft member having, at a distal end an operative element in the form of a hollow needle with a pointed tip;

an actuator handle sub assembly with an inner handle member and an outer handle member, said inner handle member having a proximal tip, a proximal end of said elongate tubular sheath member being fixed to said inner handle member, said outer handle member being slidably disposed over a proximal end portion of said inner handle member, said actuator handle sub assembly including an elongate stylist member (i) disposed inside said inner handle member, (ii) rotatably connected at a proximal end to said outer handle member, and (iii) fixedly connected to a proximal end portion of said elongate needle shaft member for longitudinally moving said elongate needle shaft member distally relative to said inner handle member and said elongate tubular sheath member so that said pointed tip is located beyond a free end of said elongate tubular sheath member; and a camming sub assembly with cooperating camming structures including (i) at least one outwardly projecting key element proximate a distal end of said elongate rigid stylist member and (ii) at least one helical groove within a proximal portion of said inner handle member, said at least one outwardly projecting key element projecting into said helical groove so as to induce said elongate needle shaft member to rotate during an axial motion of said outer handle member and said elongate needle shaft member relative to said inner handle member, said at least one helical groove starting from said proximal tip of said inner handle member and extending to a point located intermediately along said inner handle member, wherein an axial force applied to said outer handle member shifts said outer handle member in an axially distal direction from a proximally extended position relative to said inner handle member and causes said elongate needle shaft member to simultaneously advance both axially and rotationally.

5. A medical instrument for use in conjunction with an endoscope comprising an elongate insertion member, said insertion member having a biopsy or working channel, said medical instrument comprising:

an elongate tubular sheath member having a diameter sufficiently small, so that said sheath member is slidably disposable in the biopsy or working channel of said elongate insertion member of said endoscope, wherein said sheath member has an opening at a distal tip;

an elongate needle shaft member longitudinally passing through said elongate tubular sheath member, said elongate needle shaft member having, at a distal end an operative element in the form of a hollow needle with a pointed tip;

an actuator handle subassembly with an inner handle member and an outer handle member, said inner handle member having a proximal tip, a proximal end of said elongate tubular sheath member being fixed to said inner handle member, said outer handle member being slidably disposed over a proximal end portion of said inner handle member, said actuator handle sub assembly including an elongate stylist member (i) disposed inside said inner handle member, (ii) extending through a proximal end portion of said inner handle member, (iii) rotatably connected at a proximal end outside of said inner handle member to said outer handle member, and (iv) fixedly connected to a proximal end portion of said elongate needle shaft member for longitudinally moving said elongate needle shaft member distally relative to said inner handle member and said elongate tubular sheath member so that said pointed tip is located beyond a free end of said elongate tubular sheath member, said stylist member having an elongate cylindrical shaft portion at a distal end and an enlarged cylindrical section at a proximal end, said elongate cylindrical shaft portion having a diameter smaller than a diameter of said enlarged cylindrical section; and a camming subassembly with cooperating camming structures including (i) at least one outwardly projecting key element proximate a distal end of said elongate rigid stylist member and (ii) at least one helical groove within a proximal portion of said inner handle member, said at least one outwardly projecting key element projecting into said helical groove so as to induce said elongate needle shaft member to rotate during an axial motion of said outer handle member and said elongate needle shaft member relative to said inner handle member, said at least one helical groove starting from said proximal tip of said inner handle member and extending to a point located intermediately along said inner handle member, wherein an axial force applied to said outer handle member shifts said outer handle member in an axially distal direction from a proximally extended position relative to said inner handle member and causes said elongate needle shaft member including said operative element to move in the rotary direction, thereby producing a combination axial and rotary motion of said operative element, wherein said outer handle member has a given length and said elongate stylist member has a length longer than one half of the given length of said outer handle member, wherein said at least one helical groove has a number of windings and a winding pitch adapted to effectuate at least a full rotation of said elongate needle shaft member including said operative element during a complete axial stroke of said outer handle member relative to said inner handle member from a position proximally displaced relative to said inner handle member, wherein said stylist member is disposed partially outside of said inner handle member, to a distally forwardmost or maximally distal position wherein a smaller portion of said stylist member is disposed outside of said inner handle member and wherein said elongate cylindrical shaft portion is fully disposed inside said inner handle member while said enlarged cylindrical section remains outside said inner handle member.

* * * * *